June 8, 1965      R. L. HANSLER      3,188,513
OPTICAL FILTERS AND LAMPS EMBODYING THE SAME
Filed April 10, 1963
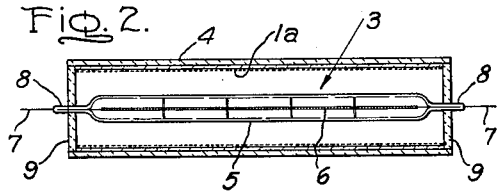
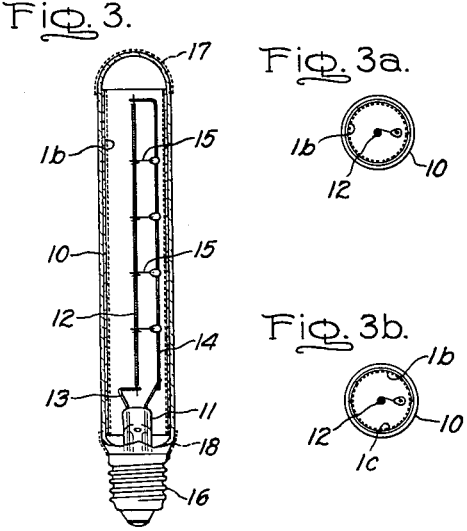
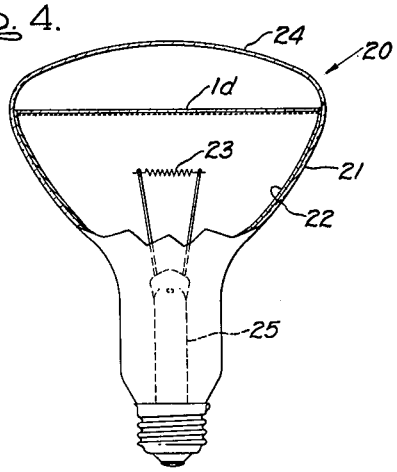
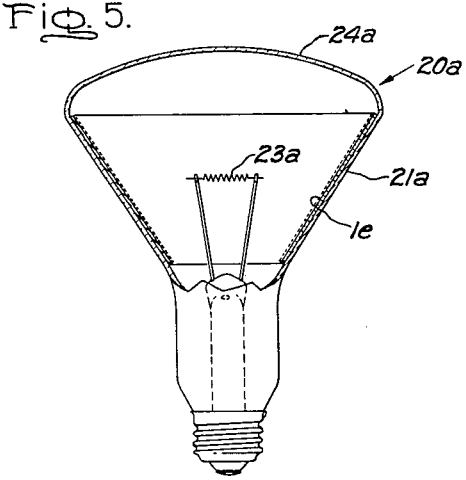
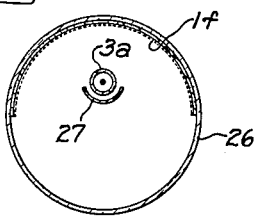
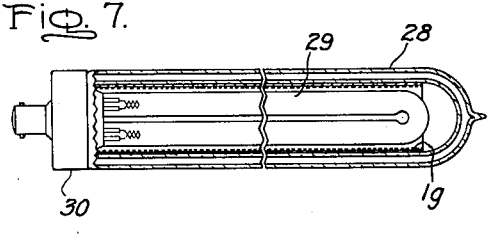
Inventor:
Richard L. Hansler
by Otto Tichy
His Attorney

United States Patent Office 3,188,513
Patented June 8, 1965

3,188,513
OPTICAL FILTERS AND LAMPS EMBODYING THE SAME
Richard L. Hansler, Cleveland, Ohio, assignor to General Electric Company, a corporation of New York
Filed Apr. 10, 1963, Ser. No. 272,006
3 Claims. (Cl. 313—112)

This invention relates generally to optical elements embodying multiple layer interference filters and to electric lamps embodying such filters.

Multiple layer optical coatings comprise two or more interference films deposited on the surface of a substrate, usually of glass, by the well known vacuum evaporation process. By varying in a definite manner the materials of the films, their sequence, number and thickness, a great variety of useful coatings is obtained. One type of filter, sometimes referred to as a "cold mirror" has the property of reflecting visible light and transmitting infrared radiation. A second type is the reverse in that it reflects infrared and transmits the visible. A third type, which might be called a "dark mirror" has the property of absorbing the visible but efficiently reflecting the infrared. Other types produce certain colors in the transmitted or reflected light. It will be understood that still other types of filters are known and are contemplated as useful in connection with the present invention.

There are some applications in which it would be highly desirable to employ such interference coatings but which are virtually excluded because of the great difficulty or impossibility of applying the coatings thereto. Such may be the case where the substrate carrying the coating has a curved surface, for example the internal surface of a hollow article such as an envelope or enclosure for electric lamps.

Accordingly, it is a principal object of this invention to provide a means whereby such interference filters are adapted for use on surfaces and in locations where direct application of the filter coatings is difficult or impractical. Another object is to provide an interference filter which is useful in the infrared part of the spectrum where interference films on ordinary heavy glass are not useful. It is also an object to provide means for application of such filters to electric lamps where direct application of the coating to the lamp envelope is impractical.

In accordance with the invention, the said objects are achieved by application of the coatings to a surface of an extremely thin, flexible, glass sheet or ribbon to which the coating may readily be applied and which may then be bent or curved for application to a curved surface or within the interior of a hollow body such as the bulb or envelope of an electric lamp. The glass substrate permits use of the filter within the interior of a lamp bulb without introducing deleterious impurities.

The flexible glass sheet may have a thickness of about 1 to 5 mils. Such flexible glass is available from Kimball Glass Company and from Corning Glass Works. One such glass is marketed by Corning Glass Works under its code number 8871 and is of a composition disclosed in its Patent 2,431,980 to W. H. Armistead, Jr., dated December 2, 1947. In addition to the feature of flexibility, because of the relatively high infrared transmission of such thin sheets of glass they are especially useful as substrates for infrared interference filters in which transmission is desired in the spectral region where glass of ordinary thickness absorbs strongly.

For the interference coating on the flexible glass substrate there are known a number of constructions. For example, a heat reflecting, light-transmitting coating may be composed of six alternate films of material of high and low refractive index such as zinc sulfide and magnesium fluoride respectively. The coating may be composed of five half-wave films, alternately high and low index material, followed by a sixth, a quarter-wave low-index film, the wavelength of reference being 550 millimicrons.

The heat transmitting, light reflecting coating may comprise 15 films. With a wavelength of reference located in the blue-green the coating may be composed of eight quarter-wave films of alternately high and low index material, followed by eight films of alternately half-wave thickness of high index material and quarter-wave thickness of low index material.

For further details of construction of such coatings, reference may be had to the publication "A Cold Commercial Reflector" by Schroeder and Turner in the Journal of the SMPTE, volume 69, page 351.

Using the same materials, but employing thicknesses and sequence of the films in a manner well known to those skilled in the art, the coating may be designed to transmit a given color. Such filters are commercially available from Bausch and Lomb Incorporated. The coatings used as color filters transmit exactly defined wavelength intervals of the visible spectrum, rejecting the remainder by virtue of their high, wavelength-selective reflectance. Examples are the red, green and blue primary colors.

Another example of coating construction is a film of a semi-conductor such as germanium, silicon, antimony sulfide or selenium of the proper thickness coated with a film or films of a dielectric material or materials of such thicknesses and indices of refraction as to minimize the reflectance for those wavelengths of the infrared which are near the region of most copious emission of an incandescent filament and/or maximize the visible reflectance. The dielectric films may consist of materials such as zinc sulfide, magnesium fluoride, aluminum oxide, magnesium oxide etc.

For further details of structure of such multiple layer interference filters, reference may be had to patents such as U.S. Patent 2,660,925—A. F. Turner, 2,700,323—H. Schroder, 2,624,238—M. E. Widdop et al. and 2,552,184 —G. J. Koch and British Patent 838,476. Details of construction of a narrow pass filter are described in an article entitled "A Symmetrical All-Dielectric Interference Filter," by H. D. Polster in Journal of Optical Society of America, volume 42, No. 1, page 21.

Examples of suitable coatings of the type which are visible absorbing and heat reflecting are described in a publication by Hass, Schroeder and Turner in the Journal of the Optical Society of America, volume 46, page 31 (1956). A particular example is the structure referred to in FIGURE 5 on page 3 of that publication wherein the flexible glass would be coated first with a thin but opaque layer of aluminum, followed by layers of germanium and silicon monoxide, each approximately one quarter wavelength thick.

For a better understanding of some of the applications to lamps of the new interference filters on flexible glass, reference is directed to the accompanying drawing wherein;

FIG. 1 is a section, on an enlarged scale, of a flexible glass sheet with the interference coating indicated by the dotted line along one surface of the sheet;

FIG. 2 is an elevation, partly in section, of a jacketed heat lamp comprising the invention;

FIG. 3 is an elevation, partly in section, of a lamp having the flexible glass filter within the envelope;

FIGS. 3a and 3b are sections of the FIG. 3 lamp showing alternative filter arrangements;

FIGS. 4 and 5 are elevations of reflector type lamps containing respective variations of filter arrangements;

FIG. 6 is a section of a heating fixture embodying the invention; and

FIG. 7 is a side view, partly in section, of a sodium lamp incorporating the invention.

Referring to FIG. 1 of the drawing, there is illustrated, in section, the flexible glass sheet or ribbon 1 which may have a thickness of about 2 mils and which is provided on one surface with an interference coating indicated at 2 and which may be of any desired construction such as those referred to hereinbefore and which is applied to the glass sheet by vacuum deposition as is well known in the art. Such a glass sheet may be bent on a radius as small as about ¾ inch. The interference coating, in even the most complicated types, is extremely thin and not more than 40 micro inches thick.

In FIG. 2 there is shown a heat lamp 3 which may be of the type disclosed and claimed in Patent 2,864,025, of Foote and Hodge and which is enclosed in an outer tubular envelope or jacket 4 which is circumferentially lined with a flexible glass filter element 1a by simply rolling up the coated flat glass sheet and inserting it into the envelope 4. The lamp 3 comprises a sealed gas filled tubular quartz bulb or envelope 5 containing an axially extending coiled tungsten filament 6 connected at its ends to respective lead in conductors 7 which extend through, and are hermetically sealed in, flattened pinch seal portions 8 at the ends of envelope 5. The lamp 3 is mounted in the axis of the outer envelope 4 in any convenient manner. As here illustrated, the envelope 4 is supported by disk members 9 which may be made of opaque ceramic material, for example, and which are supported from the ends of the lamp 3 by virtue of suitably shaped apertures engaging the pinch portions 8. The disk 9 may be cemented to the ends of the lamp and to the outer envelope. The interference coating on the flexible glass filter member 1a is of the light reflecting, heat transmitting type so that the visible light output of the lamp 3 is greatly reduced without appreciably reducing the heat or infrared output.

In FIG. 3 the lamp comprises a tubular glass or quartz bulb or envelope 10 which is closed at its upper end and which has a reentrant stem 11 sealed to its lower end. An axially extending coiled tungsten filament 12 is connected at respective ends to short and long lead-in conductors 13 and 14 extending from the stem 11, and is supported at spaced intervals by support wires 15 which are insulatively attached to the lead wire 14. A conventional screw base 16 is mounted on the lower end of the bulb and has its contacts connected to the lead wires 13 and 14. The bulb 10 is lined on its inner surface with a flexible glass sheet filter element 1b which is rolled up from a flat sheet and inserted into the bulb 10 prior to the sealing of the stem 11 thereto. The seal of the stem 11 to the end of the bulb 10 is made sufficiently far away from the filter member 1b to avoid damage to the filter. The interference film on the member 1b is capable of withstanding the temperatures used during lamp manufacture. If desired, the top and bottom ends of the bulb may be painted with an opaque paint as indicated at 17 and 18.

When the filament 12 of the FIG. 3 lamp is designed primarily for emission of infrared radiation, the flexible glass filter 1b, lining the bulb as shown in FIG. 3a, has an interference coating of the type designed to reflect light and transmit heat so as to minimize the visible light emitted by the lamp.

When the filament 12 of the FIG. 3 lamp is designed principally for emission of visible light then, as illustrated in FIG. 3b, the bulb 10 may be lined around half its circumference with a flexible glass filter element 1b of the light reflecting, heat transmitting type, and around the other half of its circumference with a flexible glass filter 1c of the heat reflecting, light transmitting type. Thereby the light will be projected through the filter 1c on one side of the bulb, and the heat will be transmitted through the filter 1b at the other side of the bulb. In that case, the filament 12 may desirably be offset from the bulb axis toward the light reflecting filter 1b to be at the focus thereof.

In FIG. 4 there is shown a conventional reflector lamp comprising a glass bulb 20 having its side walls 21 of any desired shape such as paraboloidal or ellipsoidal and internally coated at 22 with a vapor deposited reflecting surface of metal such as aluminum or silver. An incandescible tungsten filament 23 is mounted substantially at the focus of the reflecting layer 22 for concentrating the light in a beam emitted through the uncoated front or face 24 of the bulb. For projecting light of a desired color, there is provided within the bulb 20 and across the mouth of the reflector 22, a flexible glass filter member 1d of the type having an interference coating which transmits light of only a desired color. During assembly of the lamp, prior to sealing of the reentrant stem 25 to the bulb 20, the filter member 1d of proper size is rolled up and slipped through the neck of the bulb and allowed to unroll and fit therein at its maximum diameter.

The FIG. 4 lamp may alternatively be of the conventional infrared reflector lamp type wherein the filament 23 is proportioned for efficient emission of infrared radiation, and visible radiation is incidental. In that case the filter 1d is of the light reflecting, heat transmitting type to minimize the visible light.

The FIG. 5 lamp is similar to that of FIG. 4, corresponding parts being numbered the same with the addition of the letter "a" except that the metallic reflector 22 of FIG. 4 is replaced by a lining 1e of a flexible glass filter having an interference coating of the light reflecting, heat transmitting type so that the light from filament 23a is reflected from the filter through the face 24a of the lamp and the heat is transmitted rearwardly of the lamp through the filter 1e and sidewalls 21a. The filter 1e is formed from a flat flexible glass sheet cut to proper shape and rolled up for insertion into the bulb 20a. The color filter 1d of FIG. 4 may, of course, also be used in the FIG. 5 lamp if desired.

In FIG. 6, the flexible sheet glass filter 1f with an interference coating which is heat reflecting and either light absorbing or light transmitting, is used to line half the circumference of a tubular glass enclosure 26 of an infrared radiating fixture where it is desired to minimize the lighting level. At the focus of the heat reflecting filter 1f there is located a heat or infrared source which may be a lamp 3a of the type shown at 3 in FIG. 2. An opaque reflector 27 is placed under the lamp 3a to intercept light rays which would otherwise be projected from the lamp 3a out the bottom of the enclosure 26.

FIG. 7 shows the application of the heat reflecting, light transmitting flexible glass interference filter 1g to a conventional sodium lamp assembly comprising an outer jacket 28 in the form of a double wall vacuum bottle enclosing the U-shaped sodium lamp 29 and both supported in a base portion 30. The flat sheet glass filter 1g is rolled up and inserted in the interior of the jacket 28 so as to more effectively retain the heat required for proper and efficient operation of the lamp 29.

What I claim as new and desire to secure by Letters Patent of the United States is:

1. An electric lamp comprising the combination of an envelope having a source of radiant energy enclosed therein, and a self-supporting flexible filter member rolled up and inserted into said envelope and retained therein soley by engagement with the walls of said envelope.

2. An electric lamp comprising the combination of an envelope having a source of radiant energy enclosed therein, and a self-supporting flexible filter member rolled up and inserted into said envelope and retained therein solely by engagement with the walls of said envelope, said filter member being a thin transparent flexible glass sheet having on a surface thereof an optical multiple layer interference filter.

3. An electric lamp comprising the combination of an envelope having a source of radiant energy enclosed therein, and a self-supporting flexible filter member rolled up and inserted into said envelope and retained therein solely by engagement with the walls of said envelope, said filter member comprising a thin transparent flexible glass sheet having a thickness in the range of about 1 to 5 mils and a flexibility to withstand bending on a radius as small as about ¾ inch and having on a surface thereof an optical multiple layer interference filter.

References Cited by the Examiner

UNITED STATES PATENTS

| | | | |
|---|---|---|---|
| 1,971,941 | 8/34 | Pirani | 313—112 |
| 2,252,324 | 8/41 | Land | 313—111 |
| 2,391,922 | 1/46 | Roper | 313—112 |
| 2,700,323 | 1/55 | Schroder | 88—106 |
| 2,834,689 | 5/58 | Jupnik | 88—106 |
| 2,858,240 | 10/58 | Turner | 88—106 |
| 3,001,880 | 9/61 | Ruskin | 106—50 |
| 3,011,383 | 12/61 | Sylvester | 88—106 |

FOREIGN PATENTS 456,748 11/36 Great Britain.

DAVID J. GALVIN, *Primary Examiner.*

JAMES D. KALLAM, *Examiner.*